(12) United States Patent
Michalke et al.

(10) Patent No.: US 8,195,678 B2
(45) Date of Patent: Jun. 5, 2012

(54) METHOD AND DEVICE FOR PROCESSING DATA OF A PLURALITY OF DIFFERENT PRODUCTS

(75) Inventors: Juergen Michalke, Springe (DE); Tino Muenkel, Hannover (DE)

(73) Assignee: Volkswagen AG, Wolfsburg (DE)

( * ) Notice: Subject to any disclaimer, the term of this patent is extended or adjusted under 35 U.S.C. 154(b) by 140 days.

(21) Appl. No.: 11/615,585

(22) Filed: Dec. 22, 2006

(65) Prior Publication Data

US 2007/0192298 A1 Aug. 16, 2007

(30) Foreign Application Priority Data

Dec. 22, 2005 (DE) .......................... 10 2005 062 140

(51) Int. Cl.
*G06F 7/00* (2006.01)
*G06F 17/30* (2006.01)
(52) U.S. Cl. ........................ 707/758; 705/26.1; 707/944
(58) Field of Classification Search .................. 707/1–3, 707/10, 758, 770; 705/26
See application file for complete search history.

(56) References Cited

U.S. PATENT DOCUMENTS

| | | | |
|---|---|---|---|
| 6,397,212 B1 * | 5/2002 | Biffar | 707/704 |
| 7,103,592 B2 * | 9/2006 | Huret | 707/733 |
| 7,676,494 B2 * | 3/2010 | Long et al. | 707/999.107 |
| 2002/0035520 A1 * | 3/2002 | Weiss | 705/27 |
| 2002/0065707 A1 * | 5/2002 | Lancaster et al. | 705/10 |
| 2006/0241901 A1 * | 10/2006 | Hanus et al. | 702/179 |

\* cited by examiner

*Primary Examiner* — Kuen Lu
*Assistant Examiner* — Susan F Rayyan
(74) *Attorney, Agent, or Firm* — Kenyon & Kenyon LLP

(57) ABSTRACT

A device for processing data of a plurality of different products, e.g., motor vehicles, includes an electronic processing unit having a databank device, in which first and second product data of a first and a second product of the plurality of products are stored, and having a data interface for receiving inquiry data, and having an evaluation device which is designed to read out the first and second product data from the databank device as a response to the inquiry data, and to evaluate them according to an evaluation criterion, the evaluation criterion being automatically selected as a function of the first and/or the second product data.

17 Claims, 7 Drawing Sheets

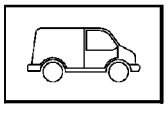

70 Terminal Device Display

| Competitive Comparison |
|---|
| VWN Vehicle Choice Category > Model Series, Wheel Base and Roof Type > Model |
| Comparable Vehicles<br>• xy1          71<br>• xy2<br>• xy3          72<br>• Other Vehicles |

FIG. 8

80 Terminal Device Display

| Competitive Comparison |
|---|
| VWN Vehicle Choice Category > Model Series > Wheel Base and Roof Type > Model |
| Volkswagen Caddy<br>• Base Price          € ........    81<br>• Special Appointments   € ........    82<br>• Total              € ........<br><br>• Storage<br>  ⊞ ○   Cover for Storage Compartment<br>83<br>84<br>• Airbags<br>  ⊞ ○   Front Passenger Airbag<br><br>• Towing Hitch<br>  ⊞ ○   Rigid Towing Hitch<br>           •<br>           •<br>           • |

FIG. 9

91 — Advantage

92 — Disadvantage

90 Terminal Device Display

Competitive Comparison

VWN Vehicle Choice Category >
Model Series > Wheel Base and Roof Type > Model

| Volkswagen | xy1 |
|---|---|
| Caddy Van | .......... |
| 1,6-l-Otto 75kW | .......... |
| 4 Door (MJ 07) | 3 Door (MJ 07) |
| • Base Price  € 13,460 | • Base Price  € 11,065 |
| • Special Appointments  € 0 | • Special Appointments  € 0 |
| • Total  € 13,460 | • Total  € 11,065 |

Volkswagen Caddy Van 1.6 Liter Otto 75kw 4 Door (MJ 07)

Has the Following Advantages

Chassis Designed Equally for Comfort and Utility
(15° Having 195 Type Tires)

97

93 —
- Dimensions
  −268mm        Longer, Higher Loading Door
  −4mm

94 —
- Payload
  −50kg         Greater Payload

95 —
- Engine
  −15PS         Greater Maximum Load

96 —
- Fuel Consumption
  −1,2L/100km   Lower Fuel Consumption
                in City Traffic

FIG. 10

METHOD AND DEVICE FOR PROCESSING DATA OF A PLURALITY OF DIFFERENT PRODUCTS

CROSS-REFERENCE TO RELATED APPLICATIONS

The present application claims priority to Application No. 10 2005 062 140.6, filed in the Federal Republic of Germany on Dec. 22, 2005, which is expressly incorporated herein in its entirety by reference thereto.

FIELD OF THE INVENTION

The present invention relates to a method and a device for processing data of a plurality of different products. In particular, the present invention relates to such a method and such a device as makes possible an automatic comparison of complex products, such as motor vehicles, using an electronic processing device.

BACKGROUND INFORMATION

The comparison of different products with the aid of a multitude of features or data of these products is a widespread procedure, for instance, for the purpose of finding a product having the performance features that are best suited for the individual requirements, or to support the identification of a purchasing decision for a specific product. Along with the increasing complexity of products, the complexity of making a comparison, that has to be carried out for a realistic evaluation of the different products, is also increasing. This applies especially if the products to be compared are configurable in many manners, as is the case, for example, for motor vehicles. For such cases an automatic execution of the product comparison would be desirable.

One difficulty, that stands in the way of such an automation of the product comparison, is, however, that, precisely in the case of complex products, a product comparison cannot be made according to a uniform, simple criterion, according to which a greater numerical value is usually more advantageous. For instance, in a motor vehicle, typically a greater loading area or a greater maximum engine performance is regarded as being advantageous, whereas, with regard to fuel consumption, a smaller characteristic number is of advantage.

SUMMARY

Example embodiments of the present invention provide a method and a device for processing data of a plurality of different products which make(s) possible an automatic comparison of even complex products. For example, such a method and such a device may make it possible to ascertain the advantageous properties of one product in comparison to those of another product.

A method for processing data of a plurality of different products, e.g., of motor vehicles, using an electronic processing unit, may include: receiving inquiry data, automatic reading out of first product data of a first product of the plurality of products and of second product data of a second product of the plurality of products from a databank device as response to the inquiry data and evaluating the first product data and the second product data according to an evaluation criterion. In the evaluation step, the evaluation criterion is selected automatically, in this context, as a function of the first product data and/or the second product data. Because the evaluation criterion is automatically selected as a function of the first and/or second product data, it becomes possible to specify for individual product data which numerical values are to be regarded as advantageous, and consequently to ascertain systematically all the properties of the first and the second product which are advantageous compared to the respective other product, and to output the respectively advantageous properties for a user. The evaluation criterion for the respective product data that are to be evaluated may be stored, in this context, in the form of a table, for example, from which the evaluation criterion is read out, or in the form of an algorithm, by whose execution the respective evaluation criterion is automatically generated. The product data may, for example, be numerical values (scalar) or a combination of several numerical values in the form of a vector.

The evaluation criterion may be comparatively simple, and may specify, for instance, whether, during a comparison of the first and the second product data, a greater or smaller numerical value is to be regarded as advantageous. The evaluation criterion may, however, also be more complex, and may specify, for instance, that the first product data are to be regarded as being advantageous only if a difference between the first and the second product data exceeds a predefined threshold value, or if the difference between the first and the second product data, standardized on the first product data, exceeds a predefined threshold value. Such more complex criteria make it possible to prevent the case in which small differences in the first product data and the second product data are evaluated as being an advantage, and are output to the user.

Furthermore, the method may be arranged such that, after the selection of the first product, a product proposal is automatically ascertained and output to the user, from which the user is then able to select the second product whose second product data are to be compared with those of the first product. The product proposal, which may include one product or a plurality of products, is selected, in this context, as a function of the first product and according to a filter criterion. The filter criterion may be adjusted as a function of the first product. This has the effect of taking into consideration that the second product, which is to be compared to the first product, is typically of such a kind that it almost coincides with the first product with regard to certain criteria that specify the filter criteria. For motor vehicles, possible filter criteria may relate, for instance, to engine performance, size of loading space, maximum payload, fuel consumption, etc. The filter may also have several stages, so that the product proposal is selected by filtering the potential comparison products with respect to several criteria. By adjusting the filter criterion to the first product, it may be considered that the product proposal is able to be ascertained according to other criteria, depending on the selection of the first product. Thus, for example, in making a comparison of different motor vehicles in transport vehicles, one will compare predominantly with other transport vehicles having a similar load capacity, so that the filter criterion includes the size of the loading space, whereas, in the case of passenger cars, a comparison will predominantly be made with respect to other motor vehicles having similar engine performance or similar fuel consumption, so that the filter criterion will be selected appropriately. The filtering of products for the ascertainment of the product proposal is able to be performed in each case in response to the selection of the first product, but may also be carried out only once, the product proposal for each first product, from which the second product is able to be selected, being stored and being read out for output to a user.

The inquiry data may include first and/or second configuration data which specify a configuration of the first and/or second product, the first and/or second product data being adjusted as a function of the first and/or second configuration data. Moreover, a configuration data proposal may be output, which facilitates for the user the selection of a certain configuration for the first and/or second product. The configuration data proposal may be selected automatically, in this instance, such that the first product and the second product are as similar as possible with respect to one or more criteria. For the case in which the products are motor vehicles, the configuration data may reflect, for instance, various special appointments. Then, too, for example, a configuration data proposal for configuration data of the second product may be output such that the second product is similar to the first product with respect to properties such as payload possibilities or safety equipment. It may also be taken into consideration automatically, in the case of the configuration data, if a special appointment selected by the user, such as a navigation system, requires another special appointment, such as a display.

The evaluation of the data of the first and second product is not limited to the evaluation of a single pair of first and second product data. Rather, a plurality of first product data and a plurality of second product data may be evaluated respectively according to one evaluation criterion. An output of a result of the evaluation may be made such that the results are sorted as to whether the respective product data of the first product or the product data of the second product are more advantageous. The output of the results of the evaluation may then, for example, be performed such that optionally only those results are output in which the first or the second product data have been ascertained according to the respective evaluation criterion.

The inquiry data may be entered by a user via a terminal device which is connected to the electronic processing unit via a data communications device. The input of the inquiry data may be made, in this context, using an interactive user guidance, so that the electronic processing unit, in response to the first user data of the inquiry data, controls the terminal device via the data communications device, in order to facilitate the input of additional data for the user. This makes available to the user at the terminal device a simple and convenient operator interface.

Furthermore, in this method, the first and/or second product data stored in the databank device are able to be updated by a data transfer via an additional data communications device between the electronic processing unit and a central server device. For this purpose, for instance, all the data stored in the databank device are able to be overwritten at regular time intervals by appropriate data stored in the central server device, or only the data stored in the server device which have changed since the last updating may be transferred from the central server device to the electronic processing unit.

The electronic processing unit may include a computer that is equipped according to programming technology, in order to execute the method. Correspondingly, a computer program product is made available, which includes instructions that are arranged such that, in the case of their execution by an electronic processing unit, the electronic processing unit executes the method.

A device for processing data of a plurality of different products, e.g., of motor vehicles, includes an electronic processing device having a databank device in which first product data of a first product of the plurality of products and second product data of a second product of the plurality of products are stored, having a data interface for receiving inquiry data and having evaluation device(s) which are configured to read out the first product data and the second product data from the databank device, as response to the inquiry data, and to evaluate them according to an evaluation criterion. In this context, the evaluation device is configured automatically to select the evaluation criterion as a function of the first product data and/or the second product data. Because the evaluation criterion is selected as a function of the first and/or second product data, the device may be particularly arranged to specify, for individual product data, which numerical values are to be regarded as advantageous. Consequently, because of the device, all those properties of the first and second product are able to be ascertained systematically that are advantageous compared to the respective other product, and the respective advantageous properties are able to be output for a user.

The device may be configured to implement the method. For this purpose, the device may include a storage device, coupled to the evaluation device, for storing a plurality of predefined evaluation criteria, the evaluation device being able to read out from the storage device the respective evaluation criterion as a function of the first product data and/or the second product data. The device may also include a filtering device which is configured to ascertain a product proposal for the second product as a function of the first product, according to a filter criterion, the filter criterion, e.g., being adjustable as a function of the first product. If the inquiry data include first and/or second configuration data, the device is able to include a configuration device for adjusting the first and/or second production data as a function of the first and/or second configuration data. The evaluation device, the filter device and the configuration device may also be arranged in an integrated manner, for instance, as a processor of a computer which is designed from a programming technology point of view such that the processor is able to execute the functions of the evaluation device, the filter device and the configuration device.

While the method and the device are able to be used generally in comparing data of a plurality of products, the method and the device may be used, e.g., for an automatic comparison of complex products, such as motor vehicles.

According to an example embodiment of the present invention, a method for processing data of a plurality of different products includes: receiving inquiry data that includes data that characterizes a first product and a second product of the plurality of products; automatically reading out of first product data of the first product and of second product data of the second product from a databank device in response to the inquiry data; automatically selecting an evaluation criterion as a function of at least one of (a) the first product data and the second product data; and evaluating the first product data and the second product data according to the evaluation criterion.

The products may include motor vehicles.

The evaluation criterion may include a comparison of the first product data and the second product data.

The evaluation criterion may include a comparison of a difference of the first product data and the second product data to a predefined threshold value.

The evaluation criterion may be predefined as a function of at least one of (a) the first product data and (b) the second product data, and the evaluating step may include reading out the evaluation criterion.

The method may include: automatically ascertaining a product proposal for the second product in accordance with a filter selected as a function of the first product, the second product being selected by a user from the product proposal; and outputting the product proposal.

The inquiry data may include at least one of (a) first configuration data and (b) second configuration data which specify a desired configuration of the first and the second product, and the method may include adjusting at least one of (a) the first product data and (b) the second product data as a function of at least one of (a) the first configuration data and (b) the second configuration data.

The method may include outputting a configuration data proposal for at least one of (a) the first configuration data and (b) the second configuration data as a function of at least one of (a) the first product data and (b) the second product data.

A plurality of first product data and a plurality of second product data may be automatically evaluated in the evaluation step.

The method may include producing a data communications connection between a terminal device and an electronic processing unit, the inquiry data may include first user input data and second user input data entered via the terminal device and transmitted via the communications connection from the terminal device to the electronic processing unit, and the electronic processing unit may activate the terminal device via the data communications connection in response to the first user input data to support a user in input of the second user input data.

The method may include: producing a data communications connection between a central server device and an electronic processing unit; and updating at least one of (a) the first product data and (b) the second product data are stored in the databank device by a data transfer via the data communications connection.

According to an example embodiment of the present invention, a non-transitory computer readable medium includes executable instructions that when read by a processing device perform a method for processing data of a plurality of different products, the method including: receiving inquiry data that includes data that characterizes a first product and a second product of the plurality of products; automatically reading out of first product data of the first product and of second product data of the second product from a databank device in response to the inquiry data; automatically selecting an evaluation criterion as a function of at least one of (a) the first product data and the second product data; and evaluating the first product data and the second product data according to the evaluation criterion.

According to an example embodiment of the present invention, a device for processing data of a plurality of different products includes n electronic processor unit. The electronic processor unit includes: a databank device adapted to store first product data of a first product and second product data of a second product; a data interface adapted to receive inquiry data which includes data characterizing the first product and the second product; and an evaluation device adapted to read out the first product data and the second product data from the databank device in a response to the inquiry data, and to evaluate the read out data according to an evaluation criterion, the evaluation device adapted to automatically select the evaluation criterion as a function of at least one of (a) the first product data and (b) the second product data.

The products may include motor vehicles.

The electronic processor unit may include a storage device connected to the evaluation device and adapted to store a plurality of predefined evaluation criteria, and the evaluation device may be adapted to read out the evaluation criterion from the storage device as a function of at least one of the first product data and the second product data.

The electronic processor unit may include a filter device adapted to ascertain a product proposal for the second product as a function of the first product in accordance with a filter criterion.

The filter device may be adapted to adjust the filter criterion as a function of the first product.

The inquiry data may include at least one of (a) first configuration data and (b) second configuration data which specify a desired configuration of the first product and the second product, and the electronic processor unit may include a configuration device adapted to adjust at least one of (a) the first product data and (b) the second product data as a function of at least one of (a) the first configuration data and (b) the second configuration data.

The device may include a terminal device connected to an interface of the electronic processor unit via a data communications device, and the inquiry data may be transmitted from the terminal device to the electronic processor unit via the data communications device.

The device may include a central server device connected to the electronic processor unit via a data communications device to update at least one of (a) the first product data and (b) the second product data stored in the databank device by a data transfer via the data communications device.

The device may be adapted to execute a method as described herein.

Example embodiments of the present invention are described in more detail below with reference to the appended Figures.

BRIEF DESCRIPTION OF THE DRAWINGS

FIGS. 7A and 7B are schematic views of a terminal device display during the selection of a product in the method illustrated in FIG. 3.

FIG. 8 is a schematic view of the terminal device display during the selection of a comparison product in the method illustrated in FIG. 3.

FIG. 9 is a schematic view of the terminal device display during a configuration of the product in the method illustrated in FIG. 3.

FIG. 10 is a schematic view of the terminal device display during an output of a comparison result in the method illustrated in FIG. 3.

DETAILED DESCRIPTION

Figure 1:
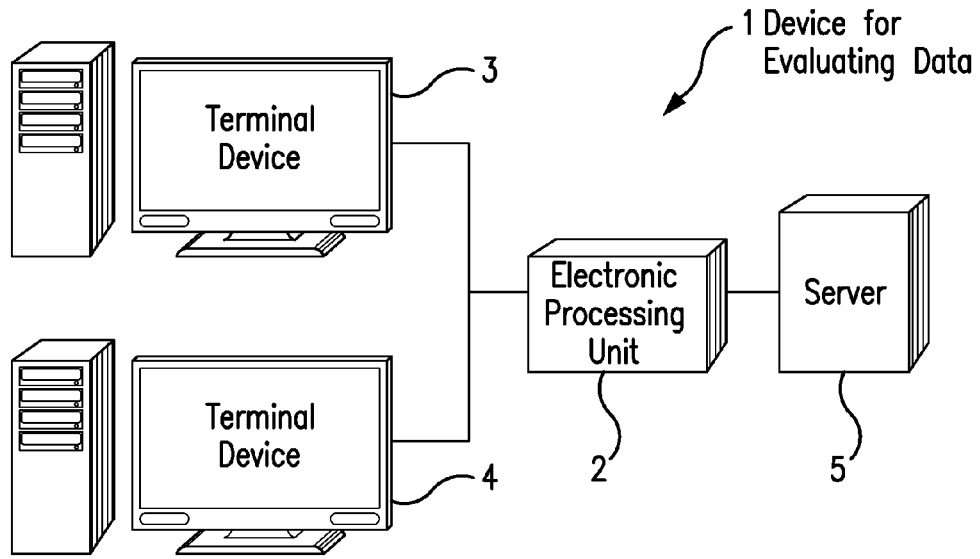
FIG. 1 schematically illustrates a device according to an exemplary embodiment of the present invention.

FIG. 1 schematically illustrates a device according to an exemplary embodiment of the present invention, which includes an electronic processing unit 2, a plurality of terminal devices 3, 4 and a server 5. Electronic processing unit 2, for instance, a computer that will be described in more detail below, is configured automatically to evaluate or to compare a plurality of products. A user is able to input inquiry data which, for instance, specify the products to be compared, via terminal devices 3, 4, which are coupled to the electronic processing unit via a data line or via another data communications device to the electronic processing unit. Displays of terminal devices 3, 4 are used in addition for the output of a result of the evaluation of the data of the products executed by electronic processing unit 2. Server 5, which is coupled to electronic processing unit 2 via an additional data line, is used for storing and making available product data that characterize the products. As will be explained in greater detail below, while all the data required for the execution of the method are stored in electronic processing unit 2, the data file stored there is updated, for instance, at regular time intervals, by a data transfer from server 5. The data held in reserve by server 5, in this instance, are not only able to be used for updating the data file of electronic processing unit 2 that are used for comparing products, but also for updating data files of additional devices, such as electronic sales assistants or electronic handbooks, using which, binding orders may be assigned, or a buyer is able to access relevant information after he has made a purchase. Making available server 5 as well as the regular adjustment of the data file of electronic processing unit 2 using server 5 provides, in this connection, that the data used by the various devices, such as the device hereof and the electronic handbooks, are consistent.

Figure 2:
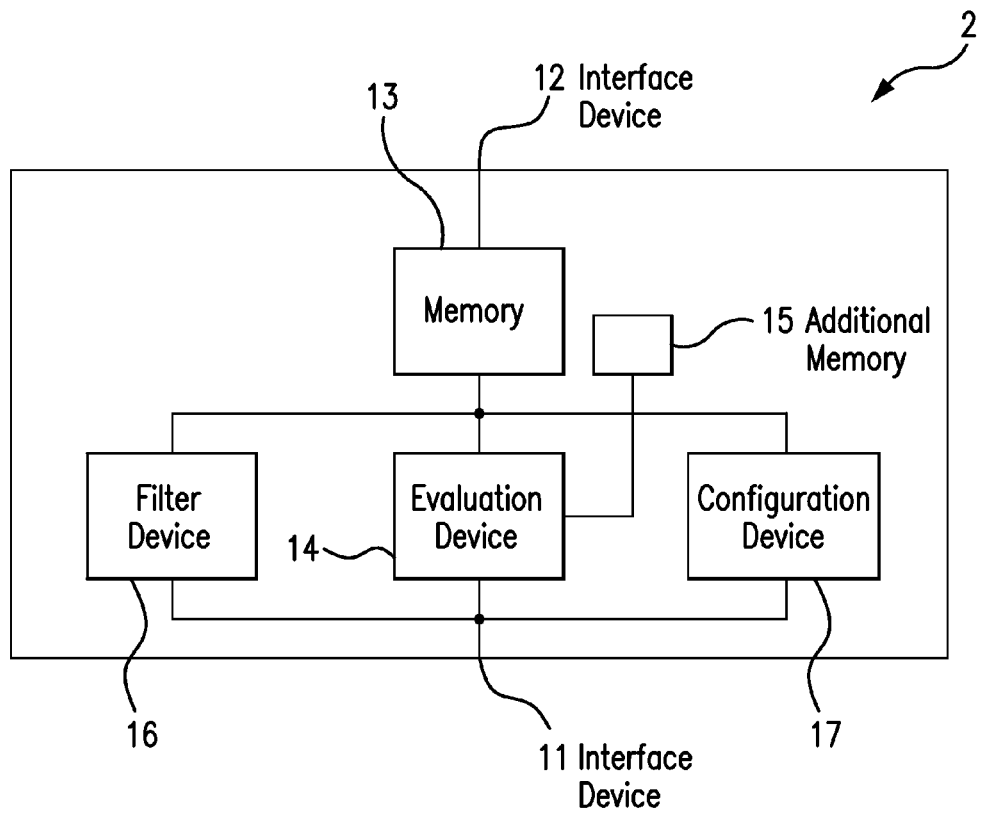
FIG. 2 schematically illustrates a functional block diagram for an electronic processing unit of the exemplary embodiment illustrated in FIG. 1.

With reference to FIG. 2, which illustrates a functional block diagram of electronic processing unit 2 of device 1, the arrangement and functionality of electronic processing unit 2 is described in further detail. Electronic processing unit 2 includes two interface units 11 and 12, via which electronic processing unit 2 is coupled to terminal devices 3, 4 and server 5 for receiving and outputting data. A memory 13 stores a databank in which, for a plurality of products, a plurality of product data are stored, respectively, so that memory 13 is used as a databank device. In this context, the product data are typically numerical values or alphanumeric strings, which characterize various properties of the respective product. If the products are motor vehicles, the plurality of product data stored in memory 13 is selected, for example, from a group including data on dimensions, driving performance, chassis, functional appointments, weights, fuel consumption, power transmission, engine, protection from theft, interior appointments, safety equipment and/or additional general properties of the motor vehicle, etc. It should be understood that this enumeration is only exemplary, and for each of the categories named, a multiplicity of product data may be stored in memory 13, in order to make possible as inclusive as possible characterization of the motor vehicle. For instance, the dimension data may include the height, the width, and the length of the motor vehicle, the height, the width and the length of the storage space, a baggage space volume, a vehicle turning circle, as well as dimensions of vehicle doors, etc. The data on weights may include, for instance, an admissible total weight, admissible axle loads, trailer weights, a maximum payload and an admissible total car and trailer weight, etc.

Electronic processing unit 2 also includes an evaluation device 14, filter device 16 and configuration device 17. While these devices are illustrated as separate devices in the functional block diagram of FIG. 2, it should be understood that the functionality of evaluation device 14, filter device 16 and configuration device 17 are able to be combined into one unit, such as a processor of a computer that is developed for programming technology, in order to execute the functions of evaluation device 14, filter device 16 and configuration device 17. Evaluation device 14 receives inquiry data via interface unit 11, which are input by a user via terminal devices 3, 4, and which determine a first and a second product whose product data are to be compared. As a function of the inquiry data, evaluation device 13 reads out first product data of the second product as well as second product data of the second product from memory 13 and evaluate it, in order to ascertain advantageous properties of the first product and advantageous properties of the second product. As an illustration, it is assumed below that the first product data and the second product data are numerical values, in each case. The ascertainment of the advantageous product data typically includes a comparison of the first and the second product data, it depending on the product data, or the property of the product characterized by them, whether a greater or smaller numerical value is to be regarded as being advantageous. Again, with reference to motor vehicles, larger loading space or greater engine performance, but, on the other hand, a smaller vehicle turning circle and lower fuel consumption may be regarded as being advantageous. Accordingly, evaluation device 14 evaluates the first and second product data according to an evaluation criterion which, in each case, specifies the conditions that have to be satisfied so that product data are to be regarded as being advantageous. In order to ascertain the evaluation criterion that is relevant to the respective product data, evaluation device 14 is coupled to an additional memory 15, in which the respective evaluation criterion is stored as a function of the product data. The respective evaluation criterion is read out by evaluation device 14. The evaluation criteria may be filed, in this instance, in tabular form, as a function of the product data, for example, or in the form of an algorithm.

As explained in greater detail below, the user is able to be supported during the input of the inquiry data via terminal devices 3, 4, in that electronic processing unit 2 ascertains a plurality of selection possibilities for a user input and outputs it to him via screen units of the terminal devices, the user being able to select the new user input from the selection possibilities. For the ascertainment of the selection possibilities, electronic processing unit 2 includes filter device 16 and configuration device 17. Filter device 16 receives the inquiry data, in which the user specifies the first product, via the interface unit. Using a filter criterion as a function of the first product, the filter device 16 selects a product proposal which may include one product or a plurality of products, the product proposal being output via the screen unit of a terminal device 3, 4, and the user being able to select the second product from the product proposal. The filter criterion used by filter device 16 for ascertaining the product proposal may, in turn, be a function of the first product, in order thus to be able to take into consideration that the products, to which the first product is typically compared, are frequently selected according to criteria which depend on the first product. If, for example, the first product is a transport vehicle, this will be predominantly compared to vehicles having a similar loading capacity, whereas a passenger car will be predominantly compared to motor vehicles having a similar engine performance and similar fuel consumption. Filter device 16 is able to ascertain the product proposal anew according to the filter criterion in response to each new inquiry by a user. Alternatively, the filter device 16 may also be designed so that, for each first product, a product proposal ascertained according to the corresponding filter criterion is stored in a memory, and is read out from it when the user has made a selection for the first product.

Complex products, such as motor vehicles, frequently have a base configuration which is configurable within a certain scope according to user or customer wishes, the product data being a function of the selected configuration. In the case of motor vehicles, for example, a multiplicity of optional special appointments may be selected, the data characterizing the vehicle varying from the respectively selected special equipment. The user is able to input desired configurations via terminal devices 3, 4 as inquiry data, configuration device 17 being coupled to evaluation device 16 in order to adjust the first product data of the first product and/or the second product data of the second product automatically, in case the user selects a new configuration for the first and/or the second product. For the support of the user in his selection of possible product configurations, configuration device 17 is designed to ascertain a plurality of possible configuration changes for the respective product, as a function of the first and second product selected by the user, and to output them to the user via terminal devices 3, 4, so that the user is able to select conveniently the respective desired configuration from the possible configuration changes. When ascertaining the configuration changes for the second product, configuration device 17 may already make a preselection based on the configuration selected by the user for the first product, so that certain properties of the first and second product agree within certain tolerances. If the products are motor vehicles, for example, configuration device 17 may be designed so as to propose to the user possible configuration changes for the second product which are selected such that the first and the second product are comparable with regard to their engine performance, their safety equipment and their other layout, etc.

Figure 3:
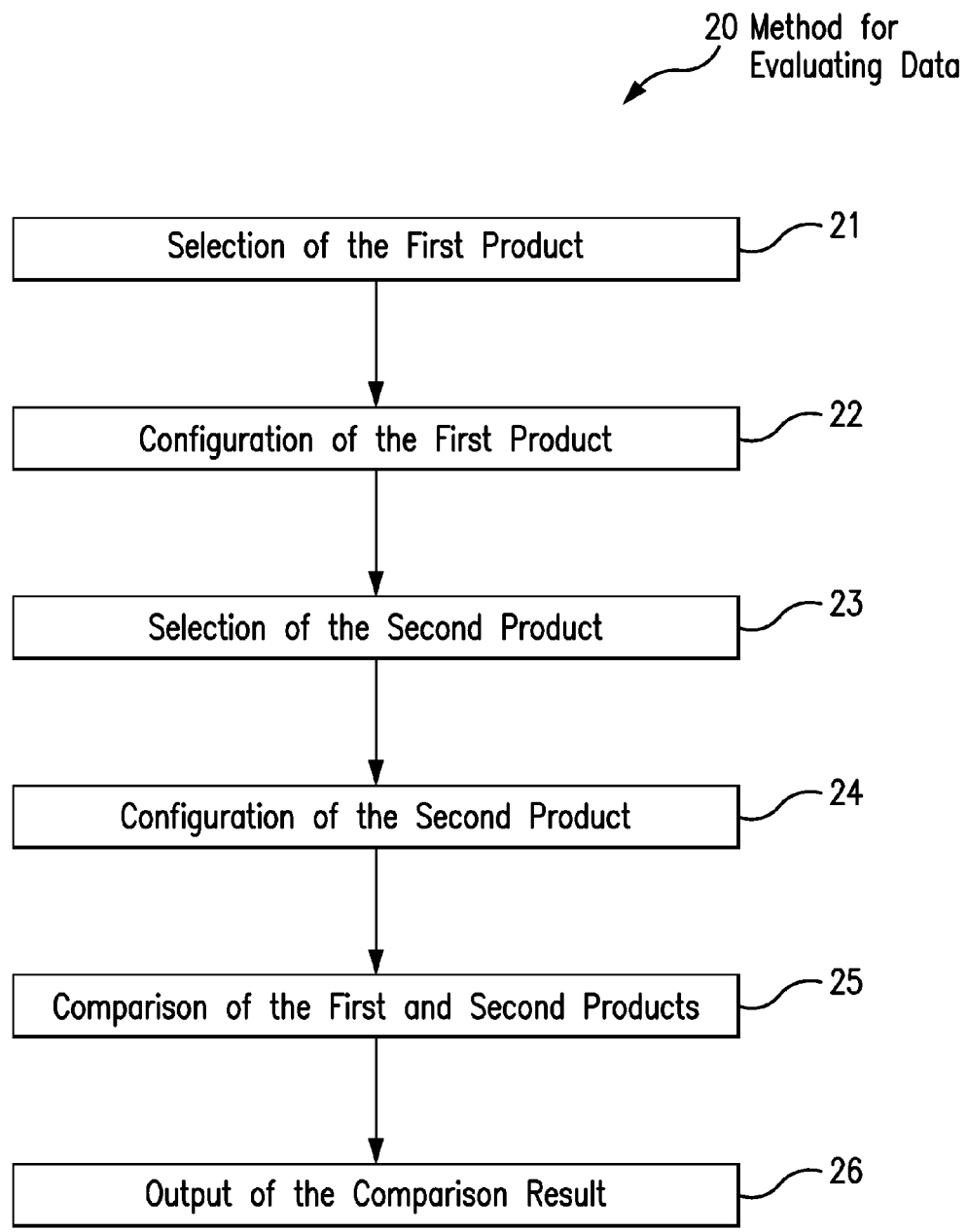
FIG. 3 illustrates a flow chart for a method according to an exemplary embodiment of the present invention.

With reference to FIG. 3, a method according to an exemplary embodiment of the present invention is explained, which is generally designated by 20, and which is able to be carried out using the device described above with reference to FIGS. 1 and 2. In method 20, the user, in steps 21 to 24, first selects the first and second product which are to be compared, and configures them according to his wishes. As explained below with reference to FIGS. 4 and 7 to 9, the user is supported in his selection and configuration by the device hereof. After the selection and configuration of the first and second product, electronic processing unit 2, in step 25 automatically compares the first and second product, by evaluating a plurality of first product data of the first product and a plurality of product data of the second product. At step 26, the result of the comparison is output to the user via the screen unit of terminal device 3, 4.

Figure 4:
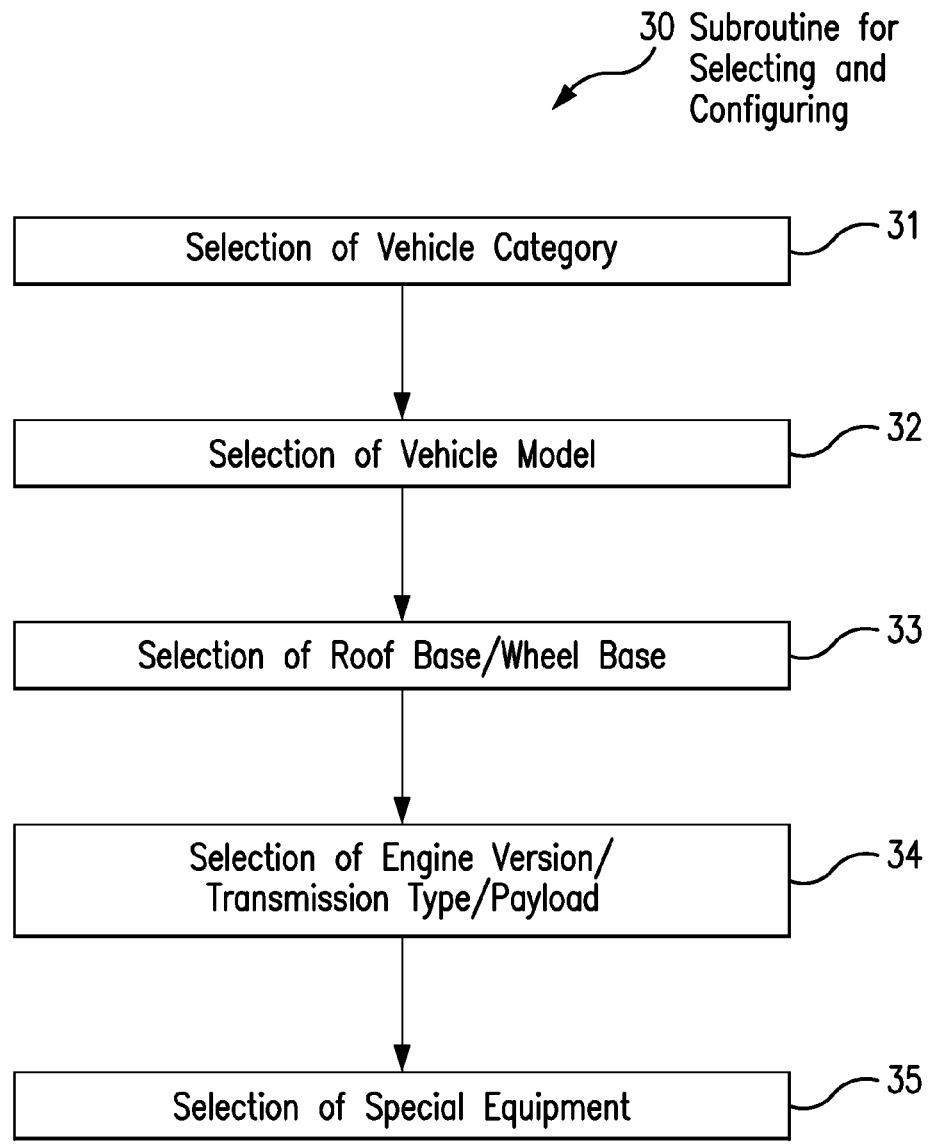
FIGS. 4 to 6 illustrate flow charts for subroutines of the method illustrated in FIG. 3.

In the selection and configuration of the first and second product, the user is supported by being requested, in the form of an interactive dialog, to make a stepwise input of additional information, as illustrated schematically in FIG. 4. The flow chart of FIG. 4 illustrates a subroutine 30 which, in the method illustrated in FIG. 3, may be used, for instance, for the implementation of steps 21 and 22 for the selection and configuration of the first product. In step 31, in this instance, first a plurality of vehicle categories is output to the user, the user selecting one of the categories. An exemplary representation of display 60 of the terminal device during this step 31 is illustrated in FIG. 7A. As illustrated, the various vehicle categories 61 correspond to a rough subdivision of vehicles according to their design and/or their use. After the selection of the vehicle category, at step 32 a plurality of vehicle models, which belong to this category, are output to the user. The vehicle models are ascertained, in this instance, as a function of the category selected by the user in advance, and are output. An exemplary representation of display 65 of the terminal device during step 32 is illustrated in FIG. 7B, the plurality of vehicle models being designated as 66. After the selection of a vehicle model, in steps 33 to 35, again a plurality of selection possibilities are made available for the layout or configuration of the vehicle model, for example, for the roof dimensions/wheel base at step 33, for the engine version/transmission type/payload at step 34, and for special equipment at step 35. Again, the user guidance may take place in this process such that the user selects one of the possible alternatives from a plurality. For example, in the case of the selection of the special equipment at step 35, however, the user guidance may take place such that all possible special equipment is listed, the user then being able optionally to select and reject individual special equipment. An exemplary display 80 of terminal device 3, 4 in the selection of special equipment is schematically illustrated in FIG. 9. All the possible special equipment is listed, in this instance, and is selectable via selection fields 84 that are able to be activated. By an activation of activatable information fields 83, additional information is made available to the user on the respective special equipment. As a function of the currently selected special equipment in each case, its costs as well as the overall costs of the motor vehicle, when the currently selected special equipment is taken into account, are ascertained automatically by electronic processing unit 2, and displayed in fields 81, 82 of the display of terminal device 3, 4.

After the first product has been selected and configured after running through subroutine 30 illustrated in FIG. 4, the second product may also be selected and configured using steps 31 to 35. However, the selection of the second product may take place such that filter device 16 of electronic processing unit 2 ascertains a product proposal that is output to the user via terminal device 4, 3. An exemplary representation of display 70 of terminal device 3, 4, in which the output of product proposal 71, from which the user is able to select the second product, is illustrated in FIG. 8. The product proposal in this instance includes three vehicles xy1, xy2 and xy3, which are comparable to the selected first product. Moreover, the user acquires the possibility freely to select the second product, via an activatable push button 72.

Figure 5:
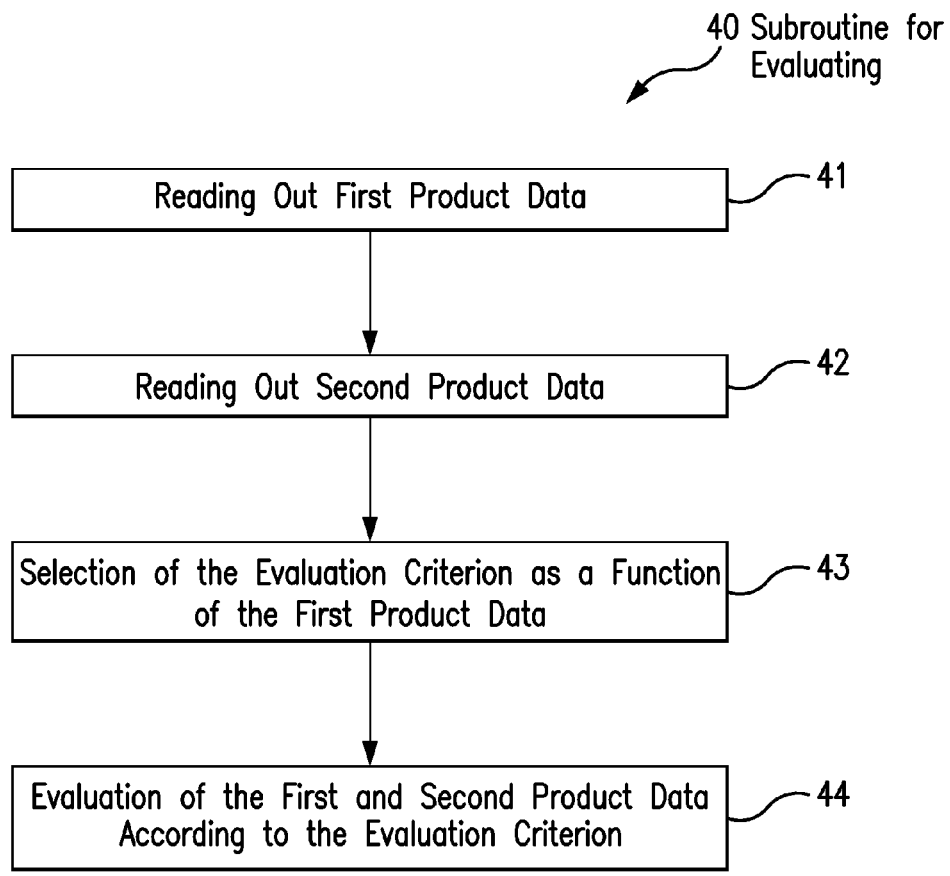
Figure 6:
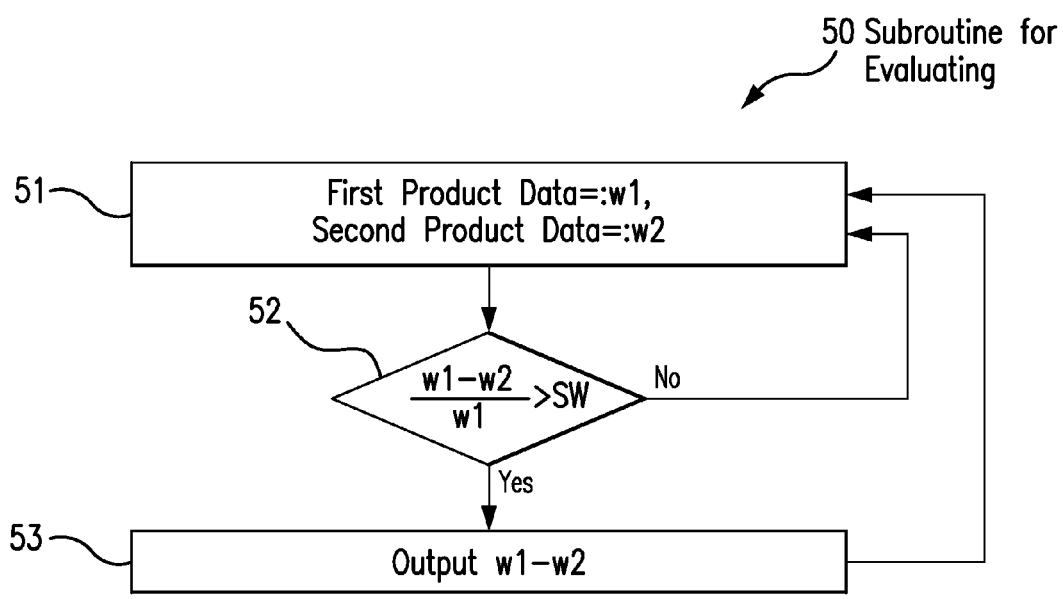

With reference to FIGS. 5 and 6, a subroutine 40 is explained in greater detail, which is able to be used in the method illustrated in FIG. 3 for implementing comparison step 25. As a function of the selection, and possibly the configuration of the first and second product, in steps 41 and 42 first and second product data are read out by evaluation device 14. At step 43, the evaluation criterion for evaluating the product data is selected, the evaluation criterion of the first and/or second product data, or rather, the property of the first and second product characterized by them, are selected, as described above. At step 44, first and second product data are subsequently evaluated according to the evaluation criterion. It should be noted that, in a comparison of complex products, typically not only one pair, but a plurality of pairs of first and second product data are automatically evaluated.

An exemplary subroutine 50, for evaluating the first and second product data, which may be used as step 44 in the subroutine illustrated FIG. 5, is explained with reference to FIG. 6, the evaluation criterion, in this case, being specified such that the first product data are to be regarded as advantageous compared to the second product data if the difference between the first and second product data, such as a length or a height of a motor vehicle, divided by the first product data, exceeds a threshold value SW. In subroutine 50, at step 51, numerical values w1 and w2 are defined, which represent the first and second product data and correspond, for instance, to the length or the height of the motor vehicle in millimeters. At step 52, $(w1-w2)/w1$ is compared to predefined threshold value SW. If the difference of w1 and w2 that is normalized to w1 does not exceed threshold value SW, a new pair of first and second product data is evaluated. Otherwise, the first product data are considered to be advantageous compared to the second product data, and the result of the evaluation step is output at step 53, before a new pair of product data is evaluated. As mentioned above, other suitable evaluation criteria may also be specified, for instance, by ascertaining whether the numerical value of the first and second product data is greater, or whether the absolute value of their difference exceeds a predefined threshold value.

By repeating the subroutines illustrated in FIGS. 5 and 6, a plurality of first product data of the first product and a plurality of second product data of the second product may be compared, and the result of the comparison may be output to the user via terminal device 3, 4. An exemplary representation of display 90 of terminal device 3, 4, during the output of the results of the comparison, is illustrated in FIG. 10. By using activatable push buttons 91, 92, the user is able to select whether the advantages or the disadvantages of the first product are to be shown. The advantages and the disadvantages of the first product are then output, for example, in the form of list entries, these being sorted into categories, for instance, as fields 93 to 96, which reflect advantages with respect to dimensions, advantages with respect to payload, advantages with respect to engine performance or advantages with respect to consumption, if the first and second products are motor vehicles. Since, e.g., in the case of complex products such as motor vehicles, there may also be advantages and disadvantages that are not quantifiable, such advantages are also able to be stored in memory 13 of electronic processing unit 2, and output together with the other results of the product comparison, as illustrated, for example, at 97.

In summary, a method and a device are provided which make possible automatic evaluation of the data of a plurality of products. The method and the device may permit comparison even of complex products, so that the method and the device are able to be used for the comparison of such products as, for instance, motor vehicles.

LIST OF REFERENCE NUMERALS 1 device for evaluating data
2 electronic processing unit
3 terminal device
4 terminal device
5 server
11 interface device
12 interface device
13 memory
14 evaluation device
15 additional memory
16 filter device
17 configuration device
20 method for evaluating data
30 subroutine for selecting and configuring
40 subroutine for evaluating
50 subroutine for evaluating
60 terminal device display
65 terminal device display
70 terminal device display
80 terminal device display
90 terminal device display

What is claimed is:

1. A method for processing data of a plurality of different products, comprising:
receiving inquiry data that includes data that characterizes a first product and a second product of the plurality of products;
automatically reading out of first product data of the first product and of second product data of the second product from a databank device in response to the inquiry data;
automatically selecting an evaluation criterion as a function of at least one of (a) the first product data and (b) the second product data;
evaluating the first product data and the second product data according to the evaluation criterion;
prior to the evaluating, automatically ascertaining a product proposal for the second product in accordance with a filter selected and adjustable as a function of the first product; and
outputting the product proposal, the second product being selected by a user for evaluation from the product proposal;
wherein the evaluation criterion includes a comparison of a difference of the first product data and the second product data to a predefined threshold value.

2. The method according to claim 1, wherein the products include motor vehicles.

3. The method according to claim 1, wherein the evaluation criterion includes a comparison of the first product data and the second product data.

4. The method according to claim 1, wherein the evaluation criterion is predefined as a function of at least one of (a) the first product data and (b) the second product data, the evaluating step including reading out the evaluation criterion.

5. The method according to claim 1, wherein the inquiry data includes at least one of (a) first configuration data and (b) second configuration data which specify a desired configuration of the first and the second product, the method further comprising adjusting at least one of (a) the first product data and (b) the second product data as a function of at least one of (a) the first configuration data and (b) the second configuration data.

6. The method according to claim 5, further comprising outputting a configuration data proposal for at least one of (a) the first configuration data and (b) the second configuration data as a function of at least one of (a) the first product data and (b) the second product data.

7. The method according to claim 1, wherein a plurality of first product data and a plurality of second product data are automatically evaluated in the evaluation step.

8. The method according to claim 1, further comprising producing a data communications connection between a terminal device and an electronic processing unit, the inquiry data including first user input data and second user input data entered via the terminal device and transmitted via the communications connection from the terminal device to the electronic processing unit, the electronic processing unit activating the terminal device via the data communications connection in response to the first user input data to support a user in input of the second user input data.

9. The method according to claim 1, further comprising:
producing a data communications connection between a central server device and an electronic processing unit; and
updating at least one of (a) the first product data and (b) the second product data stored in the databank device by a data transfer via the data communications connection.

10. A non-transitory computer readable medium storing executable instructions that when read by a processing device perform a method for processing data of a plurality of different products, the method including:
receiving inquiry data that includes data that characterizes a first product and a second product of the plurality of products;

automatically reading out of first product data of the first product and of second product data of the second product from a databank device in response to the inquiry data;

automatically selecting an evaluation criterion as a function of at least one of (a) the first product data and (b) the second product data;

evaluating the first product data and the second product data according to the evaluation criterion;

prior to the evaluating, automatically ascertaining a product proposal for the second product in accordance with a filter selected and adjustable as a function of the first product; and outputting the product proposal, the second product being selected by a user for evaluation from the product proposal;

wherein the evaluation criterion includes a comparison of a difference of the first product data and the second product data to a predefined threshold value.

11. A device for processing data of a plurality of different products, comprising:

an electronic processor unit including:
  a databank device adapted to store first product data of a first product and second product data of a second product;
  a data interface adapted to receive inquiry data which includes data characterizing the first product and the second product;
  an evaluation device adapted to read out the first product data and the second product data from the databank device in a response to the inquiry data, and to evaluate the read out data according to an evaluation criterion, the evaluation device adapted to automatically select the evaluation criterion as a function of at least one of (a) the first product data and (b) the second product data; the evaluation criterion including a comparison of a difference of the first product data and the second product data to a predefined threshold value; and
  a filter device adapted to ascertain a product proposal for the second product as a function of the first product in accordance with a filter criterion, the product proposal being output to a user for selection of the second product to be evaluated by the evaluation device; the filter device adapted to adjust the filter criterion as a function of the first product.

12. The device according to claim 11, wherein the products include motor vehicles.

13. The device according to claim 11, wherein the electronic processor unit includes a storage device connected to the evaluation device and adapted to store a plurality of predefined evaluation criteria, the evaluation device adapted to read out the evaluation criterion from the storage device as a function of at least one of (a) the first product data and (b) the second product data.

14. The device according to claim 11, wherein the inquiry data includes at least one of (a) first configuration data and (b) second configuration data which specify a desired configuration of the first product and the second product, the electronic processor unit including a configuration device adapted to adjust at least one of (a) the first product data and (b) the second product data as a function of at least one of (a) the first configuration data and (b) the second configuration data.

15. The device according to claim 11, further comprising a terminal device connected to an interface of the electronic processor unit via a data communications device, the inquiry data transmitted from the terminal device to the electronic processor unit via the data communications device.

16. The device according to claim 11, further comprising a central server device connected to the electronic processor unit via a data communications device to update at least one of (a) the first product data and (b) the second product data stored in the databank device by a data transfer via the data communications device.

17. The device according to claim 11, wherein the device is adapted to execute a method for processing the data of the plurality of different products, comprising:

receiving the inquiry data;

automatically reading out of the first product data of the first product and of the second product data of the second product from the databank device in response to the inquiry data;

automatically selecting the evaluation criterion as a function of at least one of (a) the first product data and (b) the second product data; and evaluating the first product data and the second product data according to the evaluation criterion.

* * * * *